(12) United States Patent
Zhou et al.

(10) Patent No.: US 11,501,560 B2
(45) Date of Patent: Nov. 15, 2022

(54) INFRARED TEMPERATURE MEASUREMENT FUSED WITH FACIAL IDENTIFICATION IN AN ACCESS CONTROL SYSTEM

(71) Applicant: Black Sesame International Holding Limited, Santa Clara, CA (US)

(72) Inventors: Jianyong Zhou, Shanghai (CN); Jizhang Shan, Las Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/061,566

(22) Filed: Oct. 1, 2020

(65) Prior Publication Data

US 2022/0108100 A1    Apr. 7, 2022

(51) Int. Cl.
*G06V 40/16* (2022.01)
*G01J 5/02* (2022.01)
*H04N 5/232* (2006.01)

(52) U.S. Cl.
CPC ............ *G06V 40/161* (2022.01); *G01J 5/026* (2013.01); *G06V 40/172* (2022.01); *H04N 5/23219* (2013.01)

(58) Field of Classification Search
CPC ..... G06V 40/161; G06V 40/172; G01J 5/026; G01J 5/485; G01J 5/0025; G01J 5/48; G01J 2005/0092; H04N 5/23219; G06T 2207/10048; G06T 2207/30004; G06T 7/00; G06T 2207/30196; G06T 2207/30201; G06T 2207/30232; G06T 1/00; A61B 5/015
See application file for complete search history.

(56) References Cited

U.S. PATENT DOCUMENTS

| | | | |
|---|---|---|---|
| 7,447,333 B1* | 11/2008 | Masticola | G16H 50/80 |
| | | | 382/128 |
| 10,726,245 B2 | 7/2020 | Wen | |
| 10,895,506 B1* | 1/2021 | Lander | G01J 5/047 |
| 10,978,199 B2* | 4/2021 | Boisvert | G08B 21/182 |
| 11,010,598 B2* | 5/2021 | Uchida | G06V 10/751 |
| 11,064,953 B1* | 7/2021 | Al Anezi | G01K 7/42 |
| 2017/0095157 A1* | 4/2017 | Tzvieli | A61B 5/6814 |
| 2017/0344833 A1* | 11/2017 | Ahlberg | G06V 10/145 |
| 2022/0042851 A1* | 2/2022 | Saptharishi | G01J 5/53 |

FOREIGN PATENT DOCUMENTS

| | | | | |
|---|---|---|---|---|
| CN | 106441593 A | * | 2/2017 | ............... A61B 5/01 |
| CN | 111256833 A | * | 6/2020 | |
| CN | 111289110 A | * | 6/2020 | |
| CN | 111311799 A | * | 6/2020 | |
| KR | 101754154 B1 | * | 7/2017 | |

* cited by examiner

*Primary Examiner* — Dung Hong
(74) *Attorney, Agent, or Firm* — Timothy T. Wang; Ni, Wang & Massand, PLLC (57) ABSTRACT

An example method of infrared access, comprising, receiving a plurality of visual images, receiving a plurality of infrared images, calibrating the plurality of visual images to the plurality of infrared images, determining an average temperature of the plurality of infrared images, determining an outlier temperature of an outlier infrared image of the plurality of infrared images and matching the outlier infrared image to a visual image.

8 Claims, 7 Drawing Sheets

INFRARED TEMPERATURE MEASUREMENT FUSED WITH FACIAL IDENTIFICATION IN AN ACCESS CONTROL SYSTEM

BACKGROUND

Technical Field

The instant disclosure is related to facial recognition and disease containment and specifically providing an infrared temperature measurement fused with facial identification in an access control system.

Background

The use of infrared imaging as an auxiliary diagnostic tool to help to screen out the people who may have a fever is useful to limit the spread of viral diseases, such as bacterial infections, SARS, H1N1 and the like. Facial recognition access control systems cannot detect individual's body temperature.

What is sought is a possible solution to identify a person with an elevated body temperature by embedding an infrared temperature measurement into a facial identification access system, which may reduce the spread of diseases in a controlled access environment.

SUMMARY

An example method of infrared access, comprising at least one of, receiving a plurality of visual images, receiving a plurality of infrared images, matching the plurality of visual images to the plurality of infrared images, determining an average temperature of the plurality of infrared images, determining an outlier temperature of an outlier infrared image of the plurality of infrared images and matching the outlier infrared image to a visual image.

An example non-transitory computer readable medium comprising instructions, that when read by a processor, cause the processor to perform at least one of receiving a plurality of visual images, receiving a plurality of infrared images, matching the plurality of visual images to the plurality of infrared images, determining an average temperature of the plurality of infrared images, determining an outlier temperature of an outlier infrared image of the plurality of infrared images and matching the outlier infrared image to a visual image.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
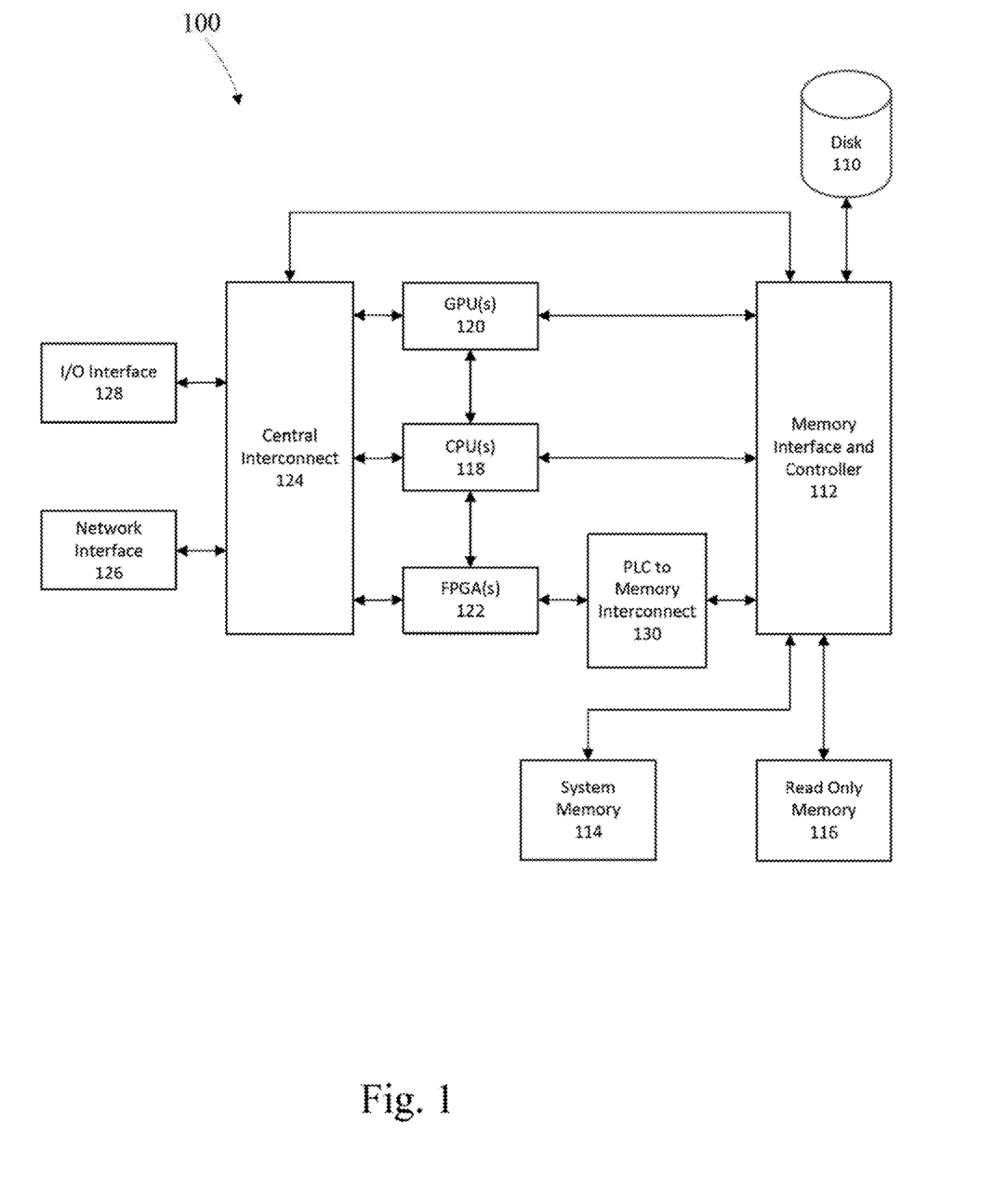
FIG. 1 is a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
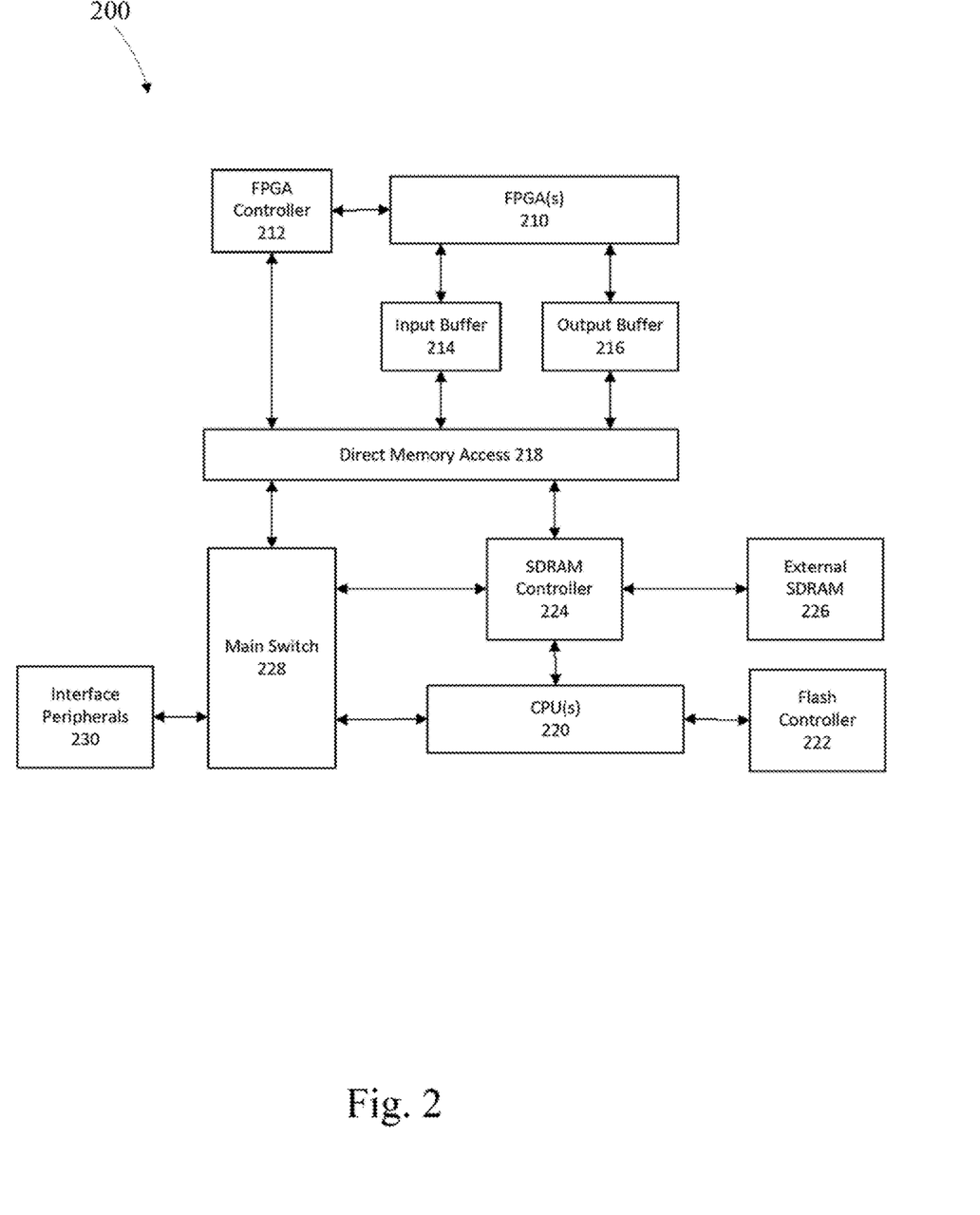
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Calibration of Visual Image Sensor and Thermal Sensor

In this disclosure a low-resolution thermal sensor such as an 80*62 infrared pixel camera is utilized. The low-resolution increases the difficulty in detecting detailed facial landmarks in the thermal image, while detecting a spot temperature on face needs a specific coordinate to indicate the region approaching the core body temperature.

Figure 3:
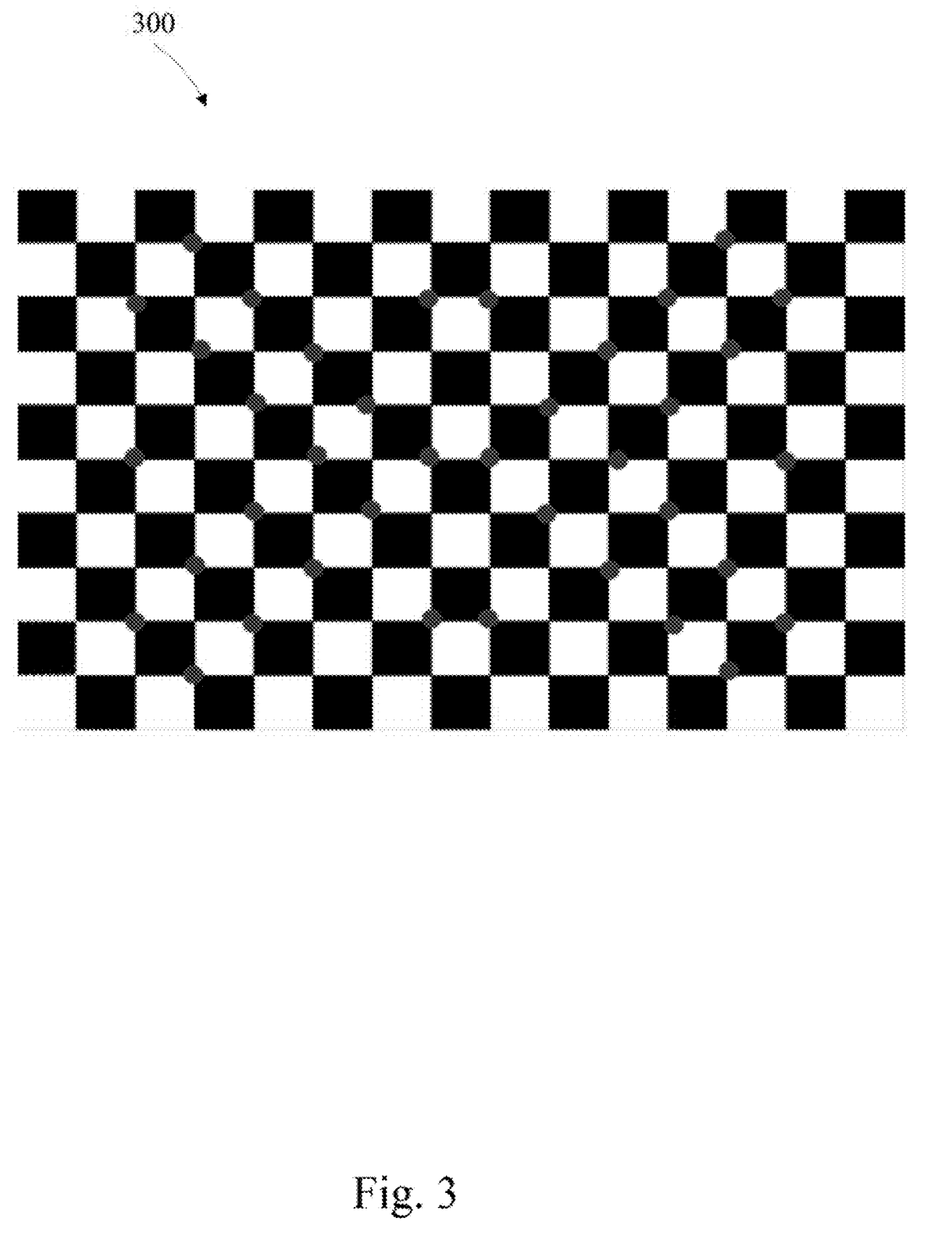
FIG. 3 is an example calibration chart in accordance with one embodiment of the disclosure.

One possible resolution to this issue is to position calibrate the thermal image and visual image. An example pre-defined chart as depicted in FIG. 3, may be utilized to calculate a relative position of the thermal image to the visual image by edge detection and red point detection.

Red point detection is based on long wave light captured by the thermal sensor; the thermal data image is matched to a visual image sensor utilized for facial recognition. If the two sensors relative positions are fixed, the system will transmit facial coordinates from the visual image to the thermal image, then a method of thermal compensation ascertains the temperature of a human's cheek and forehead.

The calibration of the visual image to the thermal image may also be performed by edge detection of the low resolution thermal image to the higher resolution visual image.

Screening Theory

A person's skin temperature is below their core temperature, which means skin temperature which adjusts to environment is not equal to a homoeothermic body temperature. People transiting through a cool or warm room will be affected by their current environment. If the room is cool enough, it may lower the skin temperature of a person with a fever to a temperature that would indicate a healthy person.

Figure 4:
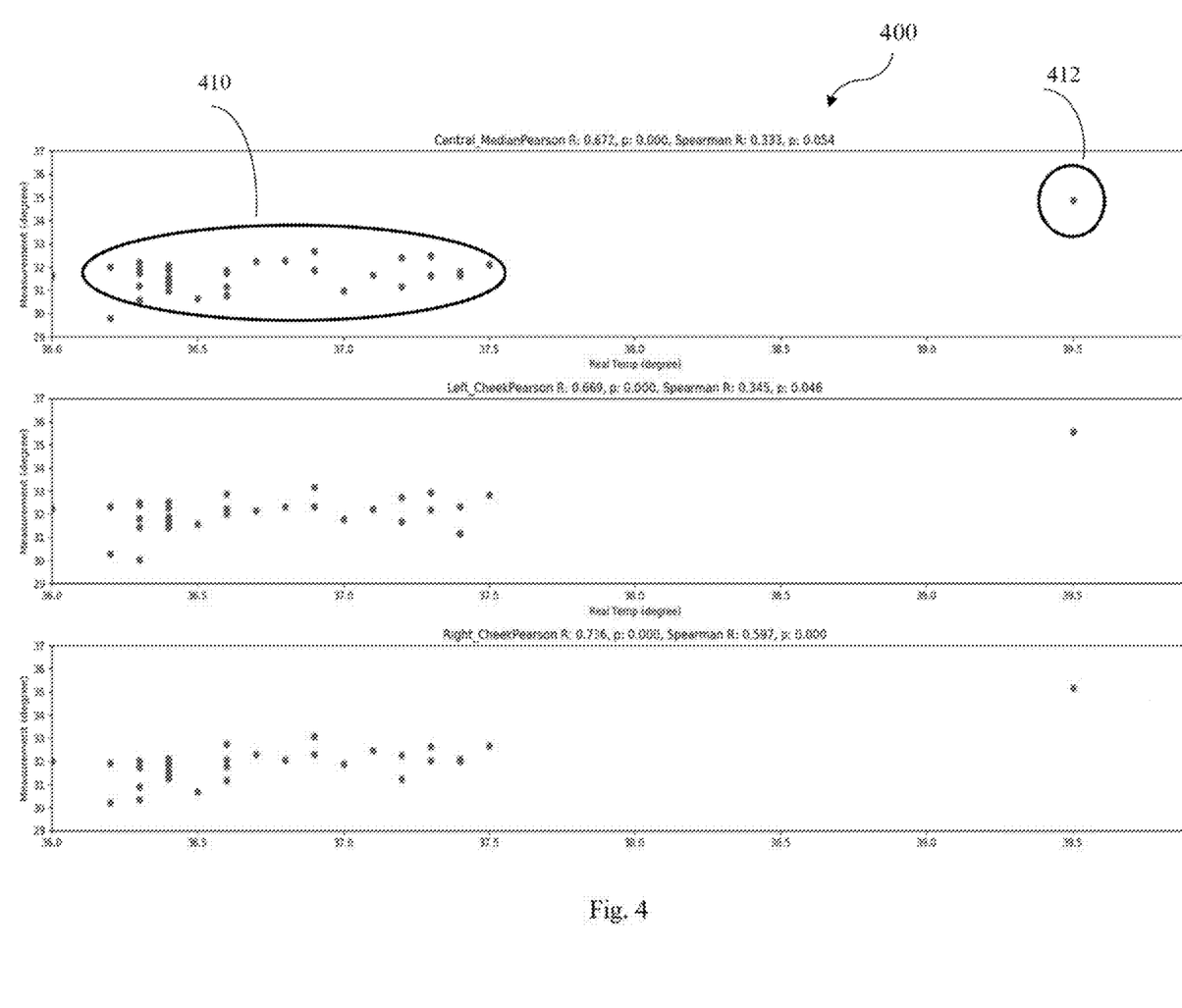
FIG. 4 is an example relative skin temperature chart in accordance with one embodiment of the disclosure.

FIG. 4 depicts a chart of the skin temperature of a recent group 410 which is used as a benchmark to detect elevated body temperature as an outlier 412, rather than simply setting a fixed alarm threshold of the 37 degree.

Figure 5:
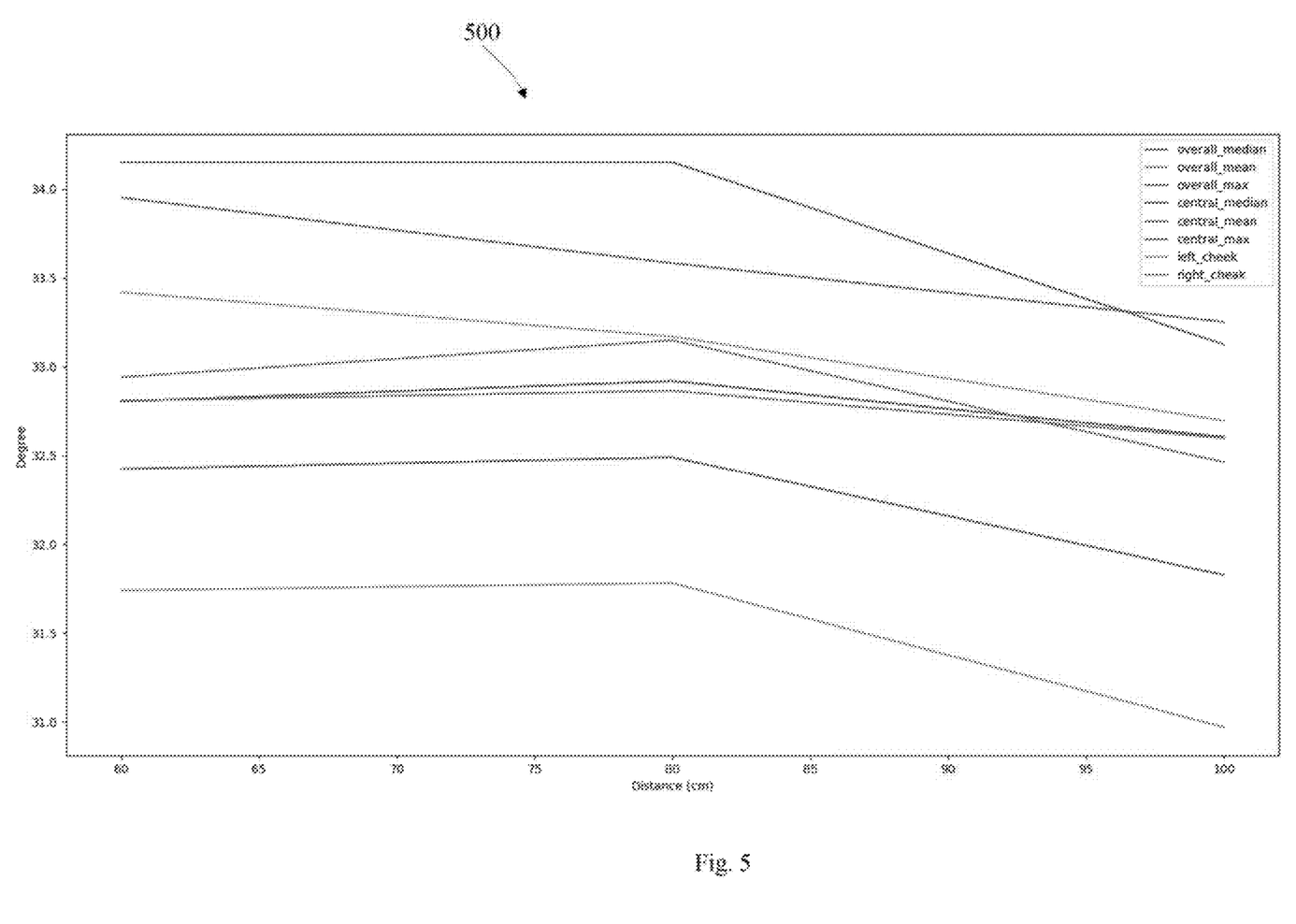
FIG. 5 is an example moving average skin temperature chart in accordance with one embodiment of the disclosure.

A cool room would also lower the skin temperature of those people without a fever. Therefore, a temperature that is significantly higher than the statistical average of people transiting the room would be detected, as shown in (FIG. 4, 412). The disclosed method assesses each person to detect skin temperature outliers with respect to a benchmark statistical average skin temperature as shown in FIG. 5. The benchmark statistical indication may be a moving average skin temperature and the like as measured by the infrared sensor. Therefore an accurate assessment of an elevated skin temperature is to measure individual skin temperatures in relation to a benchmark statistical skin temperature such as a moving average skin temperature. A moving average temperature is a succession of temperature averages determined from successive segments of a series of temperatures. Types of statistical measures would include simple moving average, cumulative moving average, weighted moving average, exponential moving average and the like.

Work Flow

As a facial recognition access control system, before gaining entrance, the subjects are placed in front of the cameras at a fixed distance for a predetermined period of time, in one example two (2) seconds, at a distance of approximately 70 cm to 100 cm. The images from the visual image sensor are input for facial recognition which reads the geometry of the detected face to find a distance between eyes and a distance from forehead to chin and the like. The facial recognition data from the visual image is matched to data stored in a facial recognition library access control based on the visual portion of the data. While performing the facial recognition, infrared images are input into a body temperature monitor system (BTMS), which generates moving average temperatures and determines those individuals whose body temperature exceeds the moving average temperature by some pre-determined threshold, such as delta temperature, delta percent temperature and the like. If the individual's temperature is abnormal, the access control system alarms and denies access to the person with fever, despite passing facial recognition.

Figure 6:
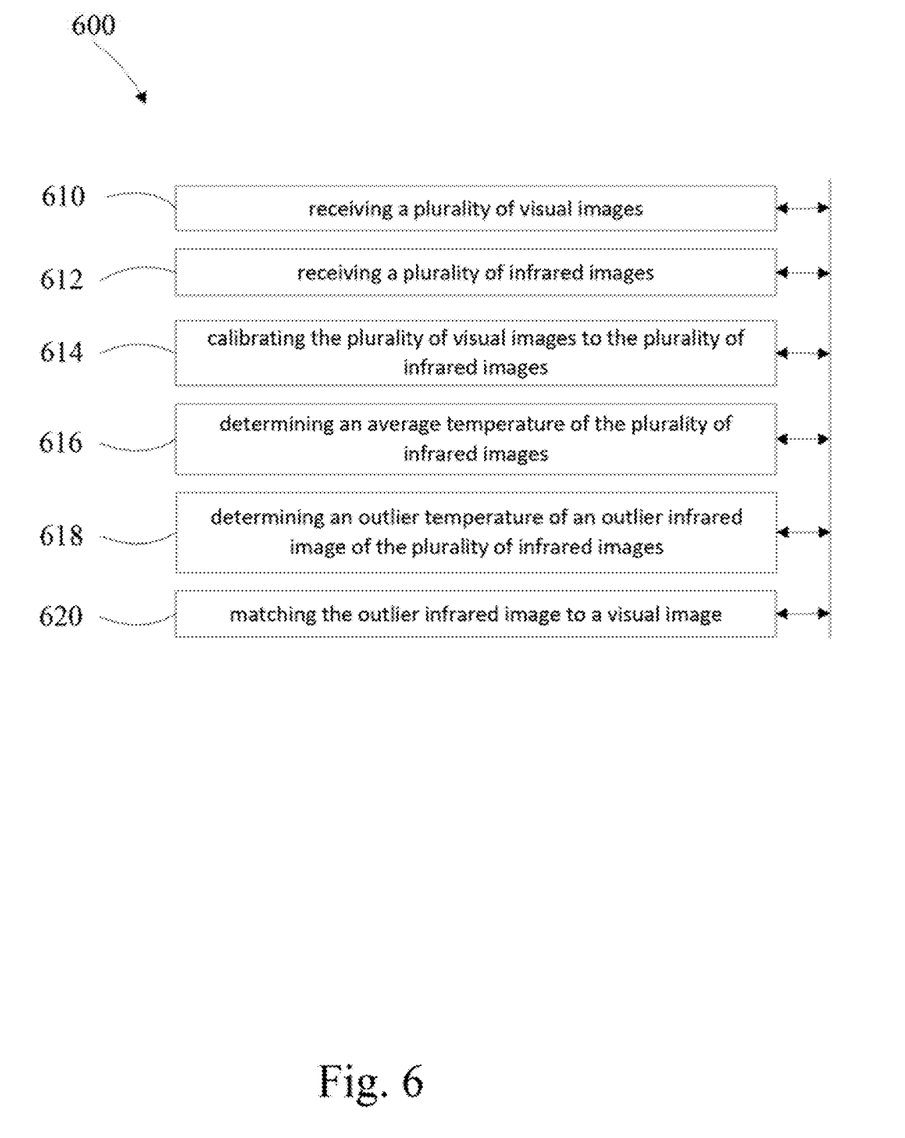
FIG. 6 is an example method in accordance with one embodiment of the disclosure.

FIG. 6 depicts an example method of infrared access, comprising at least one of, receiving 610 a plurality of visual images, receiving 612 a plurality of infrared images and calibrating 614 the plurality of visual images to the plurality of infrared images. The method then performs determining 616 an average temperature of the plurality of infrared images, determining 618 an outlier temperature of an outlier infrared image of the plurality of infrared images and matching 620 the outlier infrared image to a visual image.

The method may have the plurality of infrared images provided by a low resolution thermal sensor. The method may determine the average temperature based on a moving average and the outlier temperature may be based on a threshold temperature above the average temperature such as a delta temperature or a delta percentage temperature.

The measurement of the plurality of visual images and the plurality of infrared images may be based on a distance below a predetermined threshold distance. The method may include performing a calibration based on a predefined chart. The method may also include at least one of measuring the distance between the eyes of the plurality of visual images, measuring the distance between the forehead and the chin of the plurality of visual images and determining a facial signature of the plurality of visual images.

An example non-transitory computer readable medium comprising instructions, that when read by a processor, cause the processor to perform at least one of receiving a plurality of visual images, receiving a plurality of infrared images, matching the plurality of visual images to the plurality of infrared images, determining an average temperature of the plurality of infrared images, determining an outlier temperature of an outlier infrared image of the plurality of infrared images and matching the outlier infrared image to a visual image.

Figure 7:
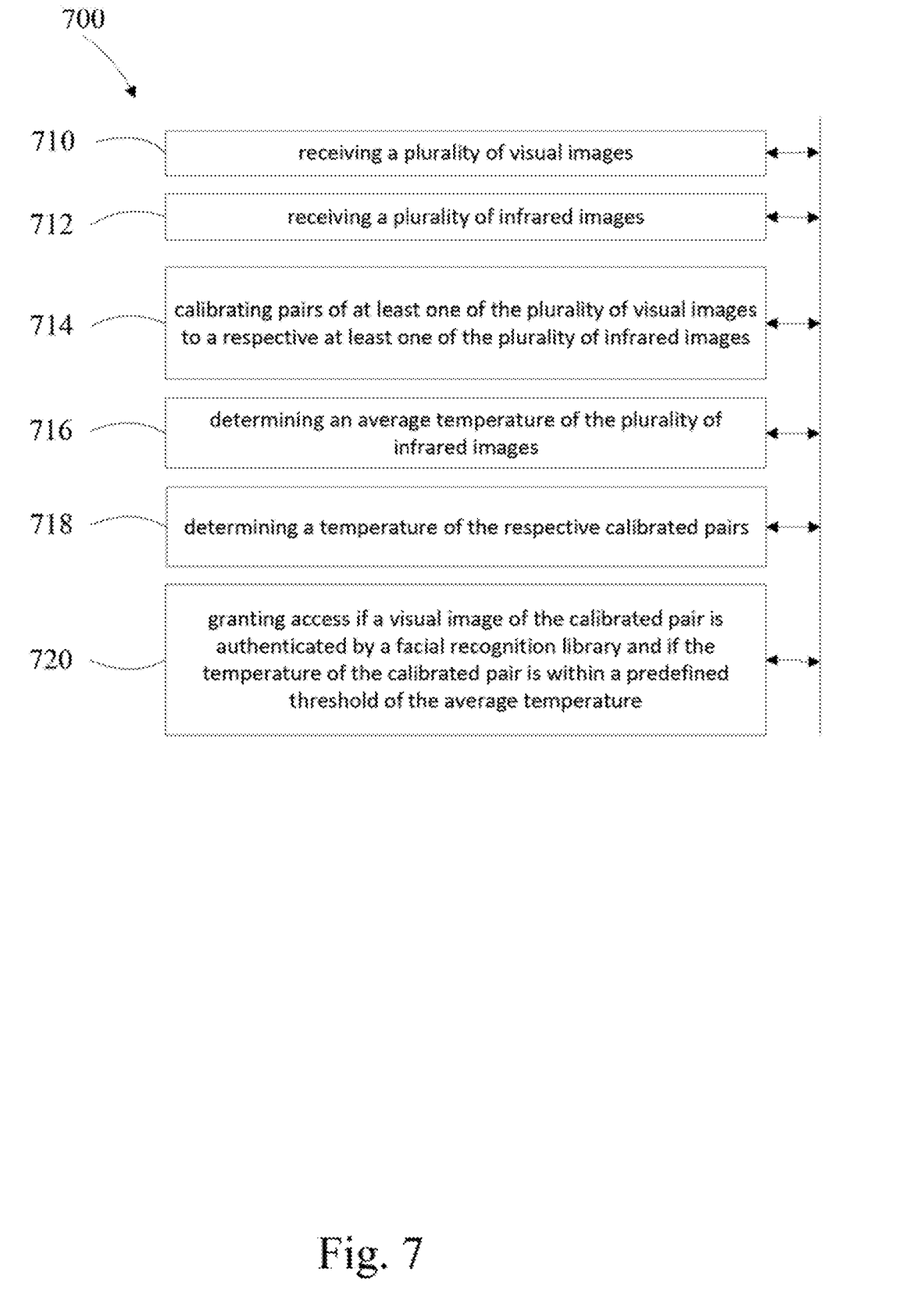
FIG. 7 is an example method in accordance with one embodiment of the disclosure.

FIG. 7 depicts an example method of infrared access, comprising at least one of, receiving 710 a plurality of visual images, receiving 712 a plurality of infrared images and calibrating pairs 714 of at least one of the plurality of visual images to a respective at least one of the plurality of infrared images. The method then comprises determining 716 an average temperature of the plurality of infrared images, determining 718 a temperature of the respective calibrated pairs and granting access 720 if a visual image of the calibrated pair is authenticated by a facial recognition library and if the temperature of the calibrated pair is within a predefined threshold of the average temperature.

An example non-transitory computer readable medium comprising instructions, that when read by a processor, cause the processor to perform at least one of receiving a plurality of visual images, receiving a plurality of infrared images, calibrating pairs of at least one of the plurality of visual images to a respective at least one of the plurality of infrared images, determining an average temperature of the plurality of infrared images, determining a temperature of the respective calibrated pairs and granting access if a visual image of the calibrated pair is authenticated by a facial recognition library and if the temperature of the calibrated pair is within a predefined threshold of the average temperature.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of infrared access, comprising:
   receiving a plurality of visual images;
   receiving a plurality of infrared images;
   calibrating the plurality of visual images to the plurality of infrared images, wherein the plurality of visual images and the plurality of infrared images are based on a distance below a predetermined threshold distance;
   determining an average temperature of the plurality of infrared images;
   determining an outlier temperature of an outlier infrared image of the plurality of infrared images; and
   matching the outlier infrared image to a visual image of the plurality of visual images.

2. The method of infrared access of claim 1 wherein the average temperature is based on a moving average.

3. The method of infrared access of claim 1 wherein the outlier temperature is based on a threshold temperature above the average temperature.

4. The method of infrared access of claim 1 further comprising determining a facial signature of the plurality of visual images.

5. A non-transitory computer readable medium comprising instructions, that when read by a processor, cause the processor to perform:
   receiving a plurality of visual images;
   receiving a plurality of infrared images;
   calibrating the plurality of visual images to the plurality of infrared images, wherein the plurality of visual images and the plurality of infrared images are based on a distance below a predetermined threshold distance;
   determining an average temperature of the plurality of infrared images;
   determining an outlier temperature of an outlier infrared image of the plurality of infrared images; and
   matching the outlier infrared image to a visual image of the plurality of visual images.

6. The non-transitory computer readable medium of claim 5, wherein the average temperature is based on a moving average.

7. The non-transitory computer readable medium of claim 5, wherein the outlier temperature is based on a threshold temperature above the average temperature.

8. The non-transitory computer readable medium of claim 5, further comprising, determining a facial signature of the plurality of visual images.

* * * * *